United States Patent [19]

Moon

[11] Patent Number: 5,687,960

[45] Date of Patent: Nov. 18, 1997

[54] TORSION BAR ASSEMBLY FOR VEHICLE SUSPENSION SYSTEM

[75] Inventor: Tae Jin Moon, Kyungsangnam-do, Rep. of Korea

[73] Assignee: Hyundai Motor Company, Seoul, Rep. of Korea

[21] Appl. No.: 631,425

[22] Filed: Apr. 12, 1996

[51] Int. Cl.⁶ .................. B60G 11/18; F16F 1/14
[52] U.S. Cl. .................. 267/273; 267/154; 280/723
[58] Field of Search .................. 267/273, 277, 267/278, 285, 284, 283, 282, 281, 280, 279; 280/721, 700, 723

[56] References Cited

U.S. PATENT DOCUMENTS

| | | | |
|---|---|---|---|
| 2,596,922 | 5/1952 | Thoms | 267/273 |
| 2,606,759 | 8/1952 | Colby | 280/723 |
| 2,624,568 | 1/1953 | Kany | 267/278 |
| 4,152,011 | 5/1979 | Sano et al. | 267/278 |
| 4,781,364 | 11/1988 | Finn et al. | 267/273 |
| 5,009,405 | 4/1991 | Smith | 267/273 |
| 5,176,370 | 1/1993 | Yamamoto | 267/273 |
| 5,360,078 | 11/1994 | Rifenburg et al. | 267/273 |

FOREIGN PATENT DOCUMENTS

| | | | |
|---|---|---|---|
| 2124924 | 1/1972 | Germany | 267/273 |
| 57-99406 | 6/1982 | Japan | 267/273 |
| 1-190515 | 7/1989 | Japan | 267/273 |
| 9210375 | 6/1992 | WIPO | 267/273 |

*Primary Examiner*—Douglas C. Butler
*Attorney, Agent, or Firm*—Finnegan, Henderson, Farabow, Garrett & Dunner, L.L.P.

[57] ABSTRACT

The present invention relates to a torsion bar assembly for use in a vehicle suspension system. The torsion bar is elongated and has axially adjacent sections, one section being more rigid than the other. A protruding bracket is fixed to the torsion bar proximate the meeting point between two sections of the torsion bar. A stop is fixed to the vehicle and disposed to engage the protruding bracket when torsional forces acting on the torsion bar exceed a predetermined level.

1 Claim, 3 Drawing Sheets ized spring constant number of the front portion 15.

TORSION BAR ASSEMBLY FOR VEHICLE SUSPENSION SYSTEM

BACKGROUND OF THE INVENTION

This invention relates to a torsion bar assembly for a vehicle suspension system which can enhance riding comfort and cornering safety by dualizing the spring constant number of the torsion bar.

In general, a suspension system for a vehicle connects an axle shaft and a vehicle body to each other and absorbs vibrations and impacts from a road surface while running so that safety and improved riding comfort of a vehicle can be obtained. To absorb impacts, a suspension system for a vehicle should be flexibly connected vertically, and to ensure driving force, braking force and centrifugal force during a vehicle's turning, which are generated at the wheels, a vehicle's suspension should be horizontally connected firmly.

Vibrations affect vehicle safety, including rolling, pitching, yawing, and bouncing of a vehicle during driving. If these vibrations are absorbed softly, riding comfort and stability are improved.

Therefore, the suspension system includes a vibration or shock absorbing device. For example, the device may be a torsion bar used in a wishbone type suspension system.

However, the type of torsion bar used in a wishbone type suspension system has the problem of not being able to realize an optimal rolling state in accordance with a changed loading weight because when the vehicle has a zero or maximum loading weight, the torsion bar spring changes to a linear form.

SUMMARY OF THE INVENTION

Accordingly, the present invention has been made in an effort to solve the above-described problem.

It is an object of the present invention to provide a suspension system using a torsion bar which can improve riding comfort and cornering safety by dualizing a spring constant number of the torsion bar.

It is another object of the present invention to provide a suspension system which has a simple structure omitting a stabilizer bar, together with achieving the previous object.

To achieve the above objects, the present invention provides a suspension system for a vehicle including a torsion bar which is disposed on a rear side of a fixing pin, longitudinally with respect to a vehicle body. The fixing pin fixes a body side of an upper control arm on the vehicle body. The torsion bar is divided into two portions having different spring rigidities respectively. That is, while one portion has a soft spring rigidity, the other portion has a strong spring rigidity. A supplementary bracket for regulating the operation of the torsion bar is disposed on a predetermined position of the torsion bar. The bracket regulates such that when bumping occurs at less than a predetermined angle, the soft rigidity portion of the torsion bar twists, and when bumping in excess of that predetermined angle, the strong rigidity portion of the torsion bar twists.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION OF THE PREFERRED EMBODIMENT

Preferred embodiments of the present invention will now be described in detail with reference to the accompanying drawings.

Figure 1:
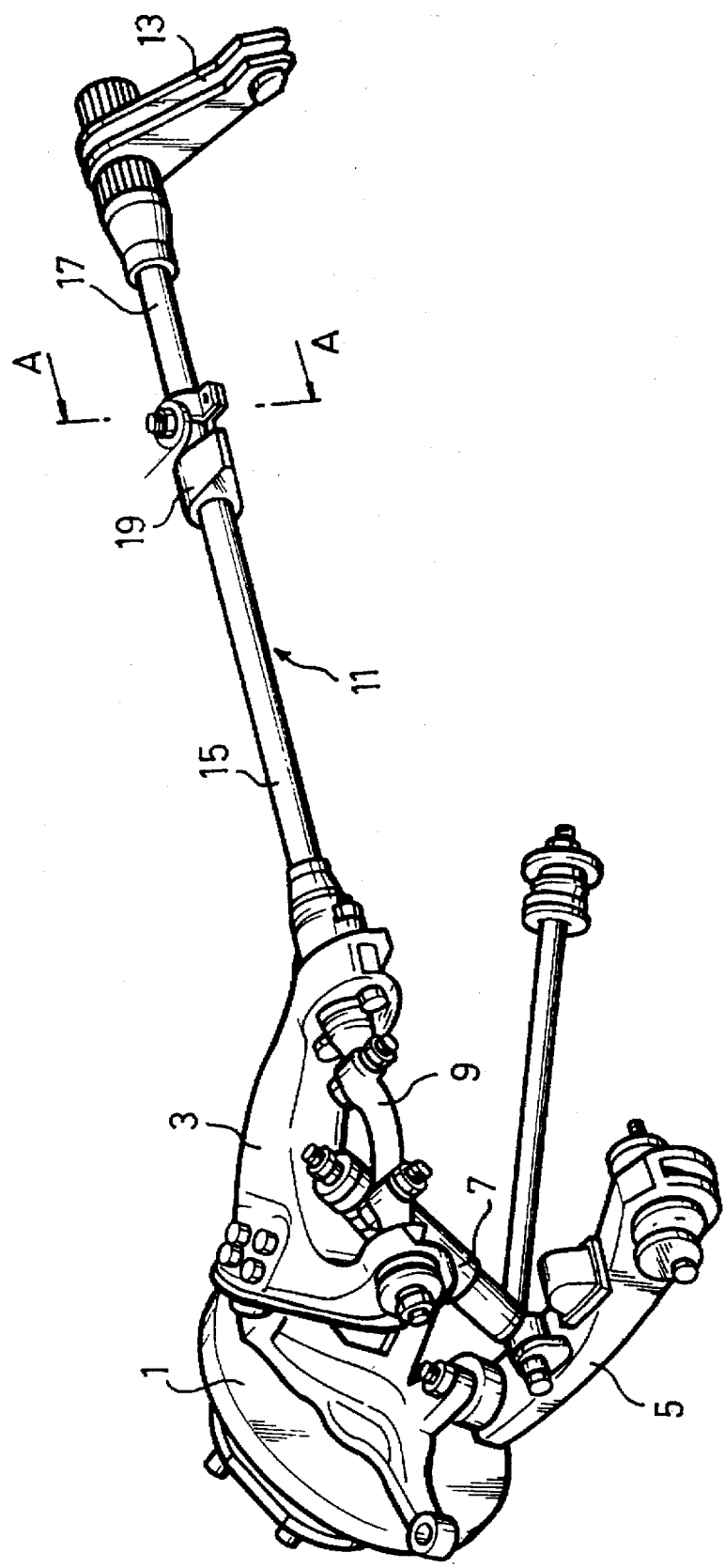
FIG. 1 is a perspective view of the suspension system according to a first preferred embodiment of the present invention.

FIG. 1 is a perspective view of a suspension system according to a first embodiment of the present invention, in which the suspension system includes a wheel carrier 1 for rotatably supporting a wheel. An upper control arm 3 and a lower control arm 5 respectively connect upper and lower ends of wheel carrier 1 with a vehicle body. To absorb shock, a shock absorber 7 is connected at its upper and lower ends to the wheel body and lower control arm 5, respectively.

The suspension system also includes a torsion bar 11. The torsion bar is disposed on a rear side of a fixing pin 9, longitudinally with respect to the vehicle body. The fixing pin fixes a side of upper control arm 3 to the vehicle body. An anchor arm 13 is disposed on a rear side of the torsion bar and connected at its free end to the vehicle body by means of a predetermined fixing device.

Figure 2:
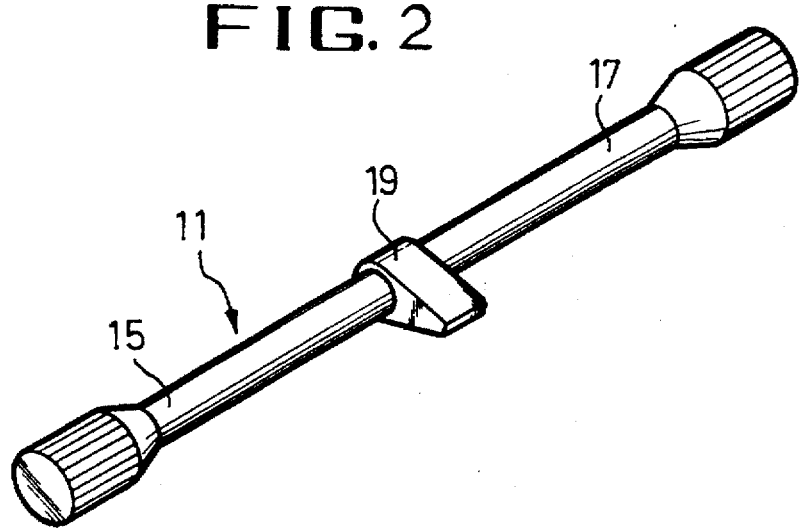
FIG. 2 is a perspective view illustrating a torsion bar of the suspension system shown in FIG. 1.

As shown in FIG. 2, torsion bar 11 is divided at its middle point into two portions having different diameters respectively. That is, front portion 15 of the torsion bar has a larger diameter, and rear portion 17 has a smaller diameter.

On a boundary point positioned between large diameter portion 15 and small diameter portion 17, a catching protrusion 19 is fixed. A supplementary bracket 23 is disposed adjacent to the catching protrusion (FIG. 1). The bracket includes a stopper bolt 21 fixed to the vehicle body. The stopper bolt restrains rotational movement of catching protrusion 19 beyond a certain predetermined angle.

Figure 3:
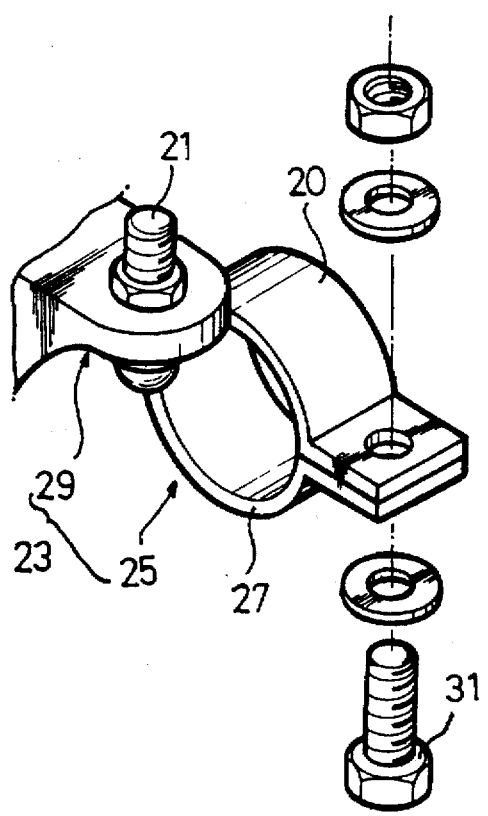
FIG. 3 is a perspective view illustrating a supplementary bracket of the suspension system shown in FIG. 1.

As shown in FIG. 3, supplementary bracket 23 includes clamp 25 and a projecting portion 29. Clamp 25 is formed with cylindrical band 27 one side of which is may be opened. Bolt 31 closes the open side of clamp 25, but band 27 when closed around torsion bar 11 permits twisting of the bar. Projecting portion 29 which is fixed to the frame of the vehicle, includes axially-adjustable stopper bolt 21.

Figure 4:
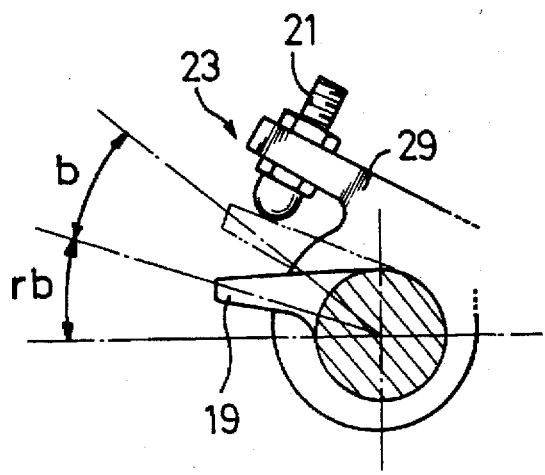
FIG. 4 is a cross-sectional view along the line A—A shown in FIG. 1.

According to the above-described suspension system, when small scale vibrations are followed by a normal straight travelling condition, the torsion bar 11 is somewhat twisted and thereby absorbs the vibrations. At this time, the twisting operation is generated in the rear small diameter portion 17. As illustrated in FIG. 4, when bumping and rebounding vibrations are of small magnitude, the small diameter portion 17, having a soft spring constant number, twists and thereby absorbs the vibrations.

However, when vibrations generate twisting of bar 11 in excess of the contacting point between catching protrusion 19 and stopper bolt 21, large diameter portion 15, being the front portion with respect to catching protrusion 19, twists and absorbs the vibrations in accordance with the obtained bumping force, while the small diameter portion, being the rear one, does not twist. The magnitude of vibration or twisting of bar 11 beyond which large diameter portion 15 absorbs the forces is determined by the fixed position of projecting portion 29 and the axial extension of adjustable stopper bolt 21.

As described above, the present invention provides a suspension system in which, through dualizing a diameter of torsion bar 11, when minutely bumping and rebounding, the small diameter portion absorbs the vibrations, while when bumping and rebounding in excess of the predetermined angle, catching protrusion 19 comes in contact with stopper bolt 21 and thereby large diameter portion 15 absorbs the vibrations.

Therefore, in the beginning of a cornering movement small diameter portion 17 of torsion bar 11, having a soft rigidity, flexibly absorbs the vibrations, while during further cornering, the large diameter portion 15, having a strong rigidity, absorbs them, so that cornering safety can be obtained and thus riding comfort and handling safety are also improved.

Figure 5:
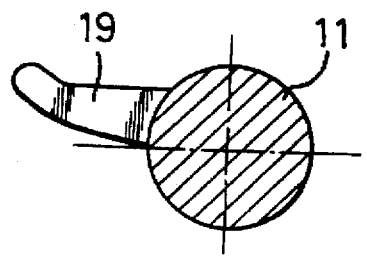
FIG. 5 is a view illustrating a catching protrusion of the suspension system according to a second preferred embodiment of the present invention.
Figure 6:
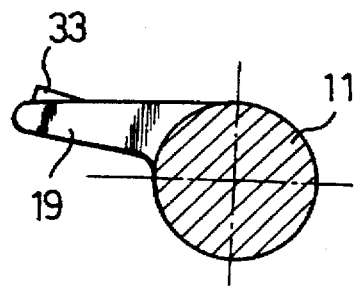
FIG. 6 is a view illustrating a catching protrusion of the suspension system according to a third preferred embodiment of the present invention.

FIGS. 5 and 6 illustrate catching protrusion 19 applied to the suspension system according to the second and third preferred embodiments of the present invention. While the catching protrusion according to the first preferred embodiment of the present invention is flat (See FIG. 4), a catching protrusion according to the second preferred embodiment of the present invention is curved upward towards its end (FIG. 5), and further a catching protrusion according to the third preferred embodiment (FIG. 6) of the present invention is generally flat like that of the first preferred embodiment of the present invention, but includes an upward projection 33 at its end.

Catching protrusions 19, according to the second and third preferred embodiments of the present invention, have the same function as the one according to the first preferred embodiment of the present invention. That is, the upward curve of or projection attached to the catching protrusion determines only the twisting time point of the large diameter portion 15.

As described above, the present invention provides a suspension system for a vehicle which can enhance riding comfort and cornering safety by simply dualizing a spring constant number of the torsion bar.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A torsion bar assembly for use in a vehicle suspension system, the assembly comprising:

an elongated torsion bar having axially adjacent sections, one section being more rigid than the other;

a protruding bracket fixed to the torsion bar proximate the meeting point between two sections of the torsion bar;

a stop fixed to the vehicle and disposed to engage the protruding bracket when torsional faces acting on the torsion bar exceed a predetermined level;

wherein said stop includes a flange fixed to the vehicle body, a stopper bolt threadably disposed in a bore in the flange, and a clamp fixed to the flange and encircling the torsion bar to retain the protruding bracket in position to engage the bolt without restricting rotation of the torsion bar.

* * * * *